Feb. 22, 1966 W. H. SLAVIK 3,237,048
RASTER DISTORTION CORRECTION
Filed May 22, 1963
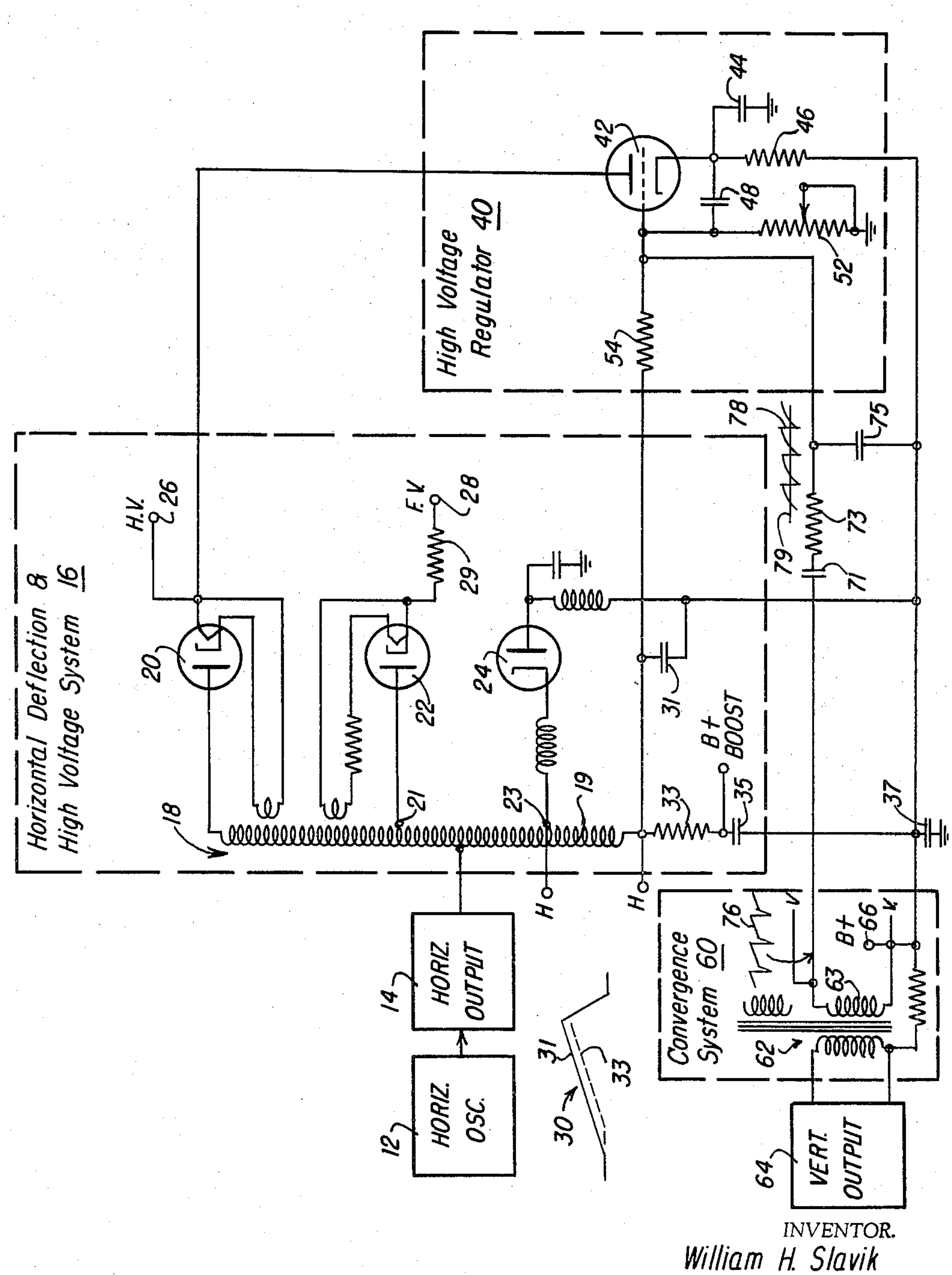
INVENTOR.
William H. Slavik
BY Mueller & Aichele
Attys.

1

3,237,048

RASTER DISTORTION CORRECTION

William H. Slavik, Chicago, Ill., assignor to Motorola, Inc., Chicago, Ill., a corporation of Illinois Filed May 22, 1963, Ser. No. 282,269
6 Claims. (Cl. 315—22)

This invention relates generally to deflection systems for color television receivers, and more particularly to circuit improvements for providing dynamic correction of pincushion distortion on the sides of the raster on the viewing screen of the cathode ray tube.

The use of wide deflection angle cathode ray tubes that have a relatively flat, rectangular viewing screen results in a distortion of the raster of the type known as pincushion distortion. Such distortion is usually corrected in black and white receivers by modifying the deflection yokes to provide non-symmetrical sweep when substantially linear sawtooth waves are applied thereto. However, with the relatively complicated deflection systems of tri-gun cathode ray tubes of the type used in color television receivers it is desirable to avoid introducing any non-symmetrical convergence errors, and essentially linear field yokes are preferable. This requires that pincushion distortion be corrected by modifying the waves generated in the deflection systems rather than by modifications of the yoke structure.

One manner of dynamically correcting pincushion distortion on the sides of the raster is to modify the waveforms of the horizontal deflection and high voltage system of the receiver with a shaped wave derived from the vertical deflection system. It is desirable in such arrangements that circuit complexity be minimized and that the overall efficiency of the horizontal deflection and high voltage system be maintained high so that raster correction can be achieved without substantial circuit change or impairment of the normal operation of either the vertical or the horizontal deflection and high voltage systems of the receiver.

It is therefore an object of the invention to provide an improved horizontal dynamic pincushion correction circuit particularly useful in color television receivers.

Another object is to provide an improved circuit wherein pincushion distortion is corrected on the sides of the raster by dynamic modification of the deflection waves produced by the horizontal deflection and high voltage system rather than changes in the deflection yokes so that a linear field yoke may be used with wide deflection angle tri-gun color cathode ray tubes.

A further object is to provide a horizontal dynamic pincushion correction circuit which does not impair the overall operation and efficiency of the horizontal deflection and high voltage system of the receiver, which circuit is simple in construction and reliable in operation.

Still another object is to provide an improved circuit to dynamically correct for pincushion distortion on the sides of the raster of a cathode ray tube by instantaneously varying horizontal deflection efficiency during vertical scan.

A feature of the invention is the provision of an integrating network to couple periodically rising waves to the control grid of the regulator tube of the high voltage circuit in response to negative vertical pulses to thereby modify the instantaneous efficiency of the horizontal deflection circuit. This causes a corresponding change in the horizontal scan width to correct for pincushion distortion on the sides of the raster.

2

Another feature is the provision of a circuit for modifying instantaneous horizontal deflection efficiency by applying a signal derived from the vertical output system to a control grid of the high voltage regulator tube associated with the horizontal deflection system and high voltage system of a television receiver. An integrating network transforms negative going vertical pulses into a rising sawtooth wave which is used to control conduction of the high voltage regulator tube once its cutoff bias is overcome. Prior to that time charging of the second anode capacitance of the cathode ray tube takes place, and the two effects dynamically change horizontal deflection efficiency during vertical scan to result in raster distortion correction.

A further feature is the provision of a wave shaping circuit which operates to provide waves to the high voltage regulator circuit of the high voltage and deflection system of a television receiver in response to vertical deflection waves, and in conjunction with charging of the second anode capacity of the cathode ray tube from the high voltage supply dynamically corrects raster distortion.

Other objects, features and attending advantages of the invention will become apparent from the following description when taken in conjunction with the accompanying drawing, which is a schematic diagram illustrating the invention.

In a particular form of the invention the regulator tube of the horizontal deflection and high voltage system of a color television receiver is controlled by a signal derived from the vertical output system of the receiver. An integrating network coupled between the vertical output system and the control grid of the high voltage regulator tube converts negative going vertical pulses into a rising sawtooth wave periodically occurring at vertical sweep rate. The regulator tube is initially cutoff and becomes increasingly conductive as the sawtooth wave exceeds a predetermined level. Control of the regulator tube, in conjunction with the charging of the second anode capacitance of the cathode ray tube through the internal high resistance of the high voltage supply, causes instantaneous horizontal deflection efficiency to be dynamically changed in a manner that increases horizontal scan width at the center portions of the raster to thereby correct for pincushion distortion at the side of the raster. At the same time the overall efficiency of the high voltage system remains constant during the vertical scan cycle.

Referring now to FIG. 1, horizontal oscillator 12 (operative at 15.75 kc.) supplies signals to horizontal output stage 14. These signals are then amplified and coupled to horizontal output transformer 18 of the horizontal deflection and high voltage system 16. Transformer 18 may be an auto-transformer, as illustrated, and may be tapped at several points to provide, in addition to line frequency scanning waves at terminals H—H, the high voltage for the receiver, the focussing voltage, and B+ boost.

The high voltage supply illustrated includes high voltage rectifier 20, focussing voltage rectifier 22, and damper diode 24. The top end of auto-transformer 18, wherein there is produced a relatively large step-up in voltage, is connected to the anode electrode of rectifier 20. High amplitude flyback pulses appearing in auto-transformer 18 are rectified by diode 20 to produce a high voltage (approximately 24 kv.) at terminal 26, connected to its cathode electrode. This high voltage is used as the second anode voltage of the cathode ray tube of the receiver.

In a like manner, the anode electrode of diode 22 is connected to an intermediate tap point 21 on auto-transformer 18. Flyback pulses of a reduced amplitude are therein rectified to provide a D.C. focussing voltage at terminal 28, connected to the cathode electrode of diode 22 by isolating resistor 29. This voltage is in the order of 4–5 kv.

Damper diode 24 is connected between a further tap point 23 on auto-transformer 18 and the B+ supply of the receiver in the conventional manner. Bootstrap capacitor 31 is also coupled between B+ and the bottom end of autotransformer 18, which point is returned to B+ by decoupling resistor 33 and filter capacitor 35. Capacitor 35 is returned to B+ so that a lower voltage unit may be used, while capacitor 37 provides a bypass for B+ to ground reference potential. This circuit arrangement provides a bootstrap circuit, as is known in the art, so that a B+ boost potential, properly filtered, may be derived at the junction point between resistor 33 and capacitor 35. Horizontal deflection signals are developed across bottom portion 19 of auto-transformer 18, and provides deflection waves across terminals H—H for coupling to the horizontal yoke system of the receiver. One such wave 30 is illustrated on an exaggerated time base. It is to be understood that horizontal deflection and high voltage system 16 is illustrative only, and that detailed circuitry usually associated with such systems such as width, linearity centering, and focus controls and the like are known in the art and have not been shown.

As is desirable in many color television receivers, the rectified high voltage output of diode 20 is regulated by a shunt regulating tube. To this end triode 42 of high voltage regulator 40 has its anode electrode connected to the cathode electrode of diode 20. The cathode of triode 42, bypassed by capacitor 44, is returned to B+ by resistor 46. The grid electrode of triode 42 is coupled to its cathode electrode by capacitor 48 and also provided with a D.C. return to ground reference potential by potentiometer 52. Control of regulator tube 42 is obtained by connecting its grid electrode, through resistor 54, to the bottom end of auto-transformer 18. Load variations in the overall high voltage system will cause corresponding variations in the B+ boost voltage appearing at this point to result in a corrective change in conduction of triode 42. The operating point for triode 42 may be set by adjustment of potentiometer 52.

Vertical deflection signals are developed across secondary winding 63 of horizontal output and convergence transformer 62, which transformer may be conveniently located in the convergence system 60 of the receiver. The primary of transformer 62 is energized by signals derived from vertical output stage 64. B+ voltage appearing at terminal 66 is distributed to the B+ boost circuit associated with the bottom ending of auto-transformer 18 as described above, and also to the cathode electrode of triode 42 by resistor 46. Terminal 66 may also be connected to winding 63 to supply vertical centering current for the convergence system (not shown).

To provide correction for pincushion distortion on the sides of the raster, vertical deflection signals developed across vertical output transformer secondary 63 are coupled by D.C. blocking capacitor 71 to an integrating network comprising resistor 73 and capacitor 75. The junction point between resistor 73 and capacitor 75 is connected to the grid electrode of triode 42. More specifically, vertical deflection wave 76, which includes a gradually rising positive portion and sharp negative going spikes, is integrated by the integrating network of resistor 73 and capacitor 75 to provide rising sawtooth wave 78 at the junction therebetween for control of the conduction of triode 42. Bias of triode 42 is adjusted so that it is initially cutoff and remains so until wave 78 rises to level 79, which occurs at the center of the raster during vertical scan. Triode 42 then becomes increasingly conductive until the end of the scan period has been reached.

In operation, during the initial portion of vertical scan when triode 42 is cutoff, the internal capacitance of the second anode of the cathode ray tube charges exponentially through the inherently high internal impedance of the high voltage supply. Typically for a tri-gun color cathode ray tube of the shadow mask type this capacitance is in the order of 2300 $\mu\mu f.$, while the high voltage supply presents 9 megohms impedance. This causes a decreasing load to be reflected back to auto-transformer 18 and accordingly the losses in horizontal deflection winding 19 decrease to result in an increase in scan width. This increase in scan width tends to compensate for pincushion distortion on the sides of the raster by making horizontal deflection more efficient at the center than at the top of the raster. At the center of the raster, when wave 78 as supplied to the grid electrode of triode 42 exceeds cutoff bias level 79, triode 42 tends to conduct to introduce increasing losses in the horizontal deflection winding 19 and thus decreasing deflection efficiency with a corresponding decrease in scan width. As wave 78 rises to its maximum point, conduction of triode 42 increases so that scan width is less at the bottom of the raster than at its center portion. As a result of the foregoing there is an instantaneous change in horizontal scan width during each vertical scan cycle, which change is greater at the center portions of the raster than at its top and bottom, and which change is in a direction to compensate for pincushion distortion on the sides of the raster. With reference to horizontal sweep wave 30, it can be seen that sweep amplitude is at a maximum 31 at the center of the raster, while it is at a minimum 33 at the top and bottom of the raster. The amplitude of wave 30 varies dynamically between the maximum 31 and the minimum 33 at intermediate points on the raster during each vertical scan cycle.

Scan width is also inversely proportional to the second anode voltage of the cathode ray tube and thus the reduction in high voltage as a result of increased loading at the top and bottom of the raster has some tendency to increase scan width at these points. Therefore, the final correction obtained is the difference between the effects of changing the horizontal deflection efficiency of the system and the accompanying affect of reducing second anode voltage. However, the instantaneous change in efficiency of horizontal deflection overrides the effect caused by reduction of the high voltage at the top and bottom of the raster so that a substantial correction for pincushion distortion on the sides of the raster can be achieved. And while instantaneous horizontal deflection efficiency changes dynamically during each vertical scan cycle, the overall average efficiency of horizontal deflection and high voltage system 16 remains constant. In addition, little or no power is required by the integrating network controlling conduction of the high voltage regulator tube. Thus, correction for pincushion distortion in the foregoing manner does not impair normal operation or require circuit modification of the horizontal and vertical deflection systems of the receiver.

In a practically constructed circuit adapted to supply 24 kv. to the second anode voltage of a tri-gun cathode ray tube of the shadow mask type and in which a 6BK4 was used as the high voltage regulator, capacitor 71 may be .25 microfarad, resistor 73, 100,000 ohms and capacitor 75, .015 microfarad. This circuit will integrate a 200 volt peak-to-peak vertical deflection signal to provide a rising sawtooth of approximately 20 volts for control of the grid of the 6BK4 regulator tube. With such a circuit it is possible to increase the radius of the pincushion distortion at the sides of the raster from 50 inches to 150 inches. The average high voltage produced by horizontal deflection and high voltage system 16 remains constant. While there is some change in instantaneous high voltage during a vertical scan cycle, it does not produce a significant change of horizontal scan width as compared to the correcting change resulting from the dynamic change in horizontal scanning efficiency; and since focusing voltage is a small percentage of second anode voltage, instantaneous focusing voltage change has a negligible effect.

The invention provides, therefore, an improved circuit for correction of pincushion distortion on the sides of a television raster in color television receivers that utilizes a regulated high voltage supply. It is reliable in operation and simple to construct, requiring a minimum number of additional circuit components. The invention may be readily incorporated with conventional circuits used with color television receivers without any modifications thereof, and without producing significant variation in circuit parameters or changes in normal circuit operation.

I claim:

1. A system for dynamically correcting for distortion on the sides of the raster of a television receiver cathode ray tube, the combination including, a horizontal deflection and high voltage system for providing horizontal deflection waves and second anode potential for said cathode ray tube, a high voltage regulator circuit including an electron valve having a current controlling electrode connected in shunt with said second anode potential, biasing circuit means connected to said current controlling electrode to maintain said electron valve in a normally cutoff condition, a source of vertical deflection waves for said cathode ray tube, and a wave shaping network coupled between said source of vertical deflection waves and said current controlling electrode to supply periodically rising waves to control conduction of said electron valve in response to said vertical deflection waves, thereby dynamically changing horizontal scan width of said raster during vertical deflection.

2. Apparatus for dynamically correcting for distortion on the sides of the raster of a television receiver cathode ray tube, the combination including, a horizontal deflection and high voltage system having a high voltage output circuit for supplying second anode potential to said cathode ray tube, said system further having output terminals for providing horizontal deflection waves for said cathode ray tube, a grid controlled electron valve connected in shunt with said output circuit and providing regulation of said second anode potential, a biasing circuit coupled to said grid to maintain said electron valve in a normally cutoff condition, a source of vertical deflection waves for said cathode ray tube, and an integrating network coupled between said source of vertical deflection waves and said grid to supply essentially sawtooth waves thereto in response to said vertical deflection waves, with said sawtooth waves causing said electron valve to become conductive upon raising to a level exceeding the cutoff bias thereof, whereby the horizontal lines of said raster are dynamically changed during vertical scan.

3. Apparatus for dynamically correcting for distortion on the sides of the raster of a television receiver cathode ray tube, the combination including, a horizontal deflection and high voltage system including an output circuit for supplying second anode voltage for said cathode ray tube, said system further supplying horizontal deflection waves for said cathode ray tube, an electron valve having anode, cathode and control grid electrodes, circuit means connecting said anode and cathode electrode across said high voltage output circuit, circuit means for supplying a biasing potential indicative of the magnitude of said anode potential to said control grid electrode, with said electron valve biased to a normally cutoff condition, a source of vertical deflection waves for said cathode ray tube, and a wave shaping network coupling said source of vertical deflection waves to said control grid electrode, said wave shaping network including integrating means to thereby supply essentially sawtooth waves to said control grid electrode in response to said vertical deflection waves, with said sawtooth waves causing said electron valve to become increasingly conductive upon exceeding the cutoff bias thereof, thereby dynamically changing the width of the horizontal lines of said raster during vertical scan.

4. In a television receiver having a cathode ray tube, a horizontal deflection and high voltage system having an output transformer, said system including first circuit means coupled with said transformer for deriving horizontal deflection waves therefrom and second circuit means coupled with said transformer for producing a second anode potential for said cathode ray tube, a grid controlled regulator tube connected in shunt with said second circuit means, a source of vertical deflection waves, a wave shaping network coupled between said source of vertical deflection waves and said grid to supply essentially sawtooth waves thereto in response to said vertical deflection waves, and circuit means coupled to said grid to bias said regulator tube to a normally cutoff condition, so that charging of the internal second anode capacitance of said cathode ray tube causes increasing horizontal scan width during a first interval of vertical scan of the raster thereof, and so that said regulator tube is rendered conductive by said sawtooth wave during a subsequent interval of vertical scan of said raster, thereby changing the instaneous efficiency of said horizontal deflection and high voltage system to produce dynamic correction of distortion of said raster.

5. In a television receiver having a cathode ray tube, a horizontal deflection and high voltage system including a horizontal output transformer, said system including first circuit means coupled with said transformer for deriving horizontal deflection waves therefrom and second circuit means coupled with said transformer for producing a second anode potential for said cathode ray tube, a high voltage regulator including an electron valve having anode, cathode and control grid electrodes, with said anode and cathode electrodes connected across said second circuit means, a source of vertical deflection waves, a wave shaping network coupled between said source of vertical deflection wave and said control grid electrode, said wave shaping network including integrating means to supply essentially sawtooth waves to said control grid electrode in response to said vertical deflection waves, and bias circuit means connected to said control grid electrode to maintain said electron valve in a normally cutoff condition, so that charging of the internal second anode capacitance of said cathode ray tube progressively increase shorizontal deflection circuit efficiency to cause an increase in horizontal scan width during the first half of vertical scan of the raster of said cathode ray tube, and so that said electron valve is rendered conductive by said sawtooth waves during the second half of vertical scan of said raster to progressively decrease horizontal circuit deflection efficiency and to cause a decrease in horizontal scan width, thereby providing dynamic correction for pincushion distortion on the sides of said raster.

6. In a television receiver having a cathode ray tube, a horizontal deflection and high voltage system having a horizontal output transformer, a high voltage rectifier circuit coupled with said horizontal output transformer for producing second anode potential for said cathode ray tube, terminal means connected to said horizontal output transformer for deriving horizontal deflection waves therefrom, a high voltage regulator including an electron valve having anode, cathode and control grid electrodes, with said anode and cathode electrodes connected in shunt with said high voltage rectifier circuit, bias means including circuit means coupling said control grid electrode to one of said terminals, with said electron valve normally biased to a non-conducting state, a source of vertical deflection waves, and an integrating network coupled between said source of vertical deflection waves and said control grid electrode, said integrating network supplying essentially sawtooth waves to said control grid electrode, so that charging of the internal second anode capacitance of said cathode ray tube progressively increases horizontal deflection circuit efficiency to cause an increase in horizontal scan width during the first half of vertical scan, and so that said electron valve is rendered conductive by said sawtooth waves during the second half of vertical scan to progressively decrease horizontal deflection circuit efficiency to cause decreasing horizontal scan width, thereby producing dynamic correction for pincushion distortion on the sides of the raster of said cathode ray tube.

No references cited.

DAVID G. REDINBAUGH, *Primary Examiner.*